(12) United States Patent
Tsukamoto et al.

(10) Patent No.: US 6,208,464 B1
(45) Date of Patent: Mar. 27, 2001

(54) TREMBLE PREVENTING DEVICE

(75) Inventors: Shinji Tsukamoto, Saitama; Ken Hirunuma, Tokyo, both of (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/318,758

(22) Filed: May 26, 1999

(30) Foreign Application Priority Data

May 26, 1998 (JP) .................................................. 10-144371

(51) Int. Cl.$^7$ .................................................. G02B 27/64
(52) U.S. Cl. ........................ 359/557; 359/407; 359/554
(58) Field of Search ........................ 359/554–557, 359/694–706, 813–814, 823–824, 407–412; 396/52–55, 134, 104; 348/208; 310/316, 317; 250/201.2

(56) References Cited

U.S. PATENT DOCUMENTS

| 4,936,664 | | 6/1990 | Haraguchi et al. | 396/52 |
|---|---|---|---|---|
| 4,970,540 | | 11/1990 | Vasey et al. | 359/554 |
| 5,172,276 | * | 12/1992 | Ueyama et al. | 359/813 |
| 5,305,040 | | 4/1994 | Enomoto | 396/52 |
| 5,448,329 | * | 9/1995 | Nakata | 396/104 |
| 5,461,513 | | 10/1995 | Maruyama | 359/557 |
| 5,493,163 | * | 2/1996 | Nishikawa | 310/316 |
| 5,696,999 | * | 12/1997 | Matsushima et al. | 396/55 |
| 5,754,339 | | 5/1998 | Kanai et al. | 359/557 |
| 5,831,671 | | 11/1998 | Chigira et al. | 396/55 |
| 5,850,576 | * | 12/1998 | Matsuzawa | 396/55 |
| 5,959,769 | * | 9/1999 | Yoneyama | 359/557 |
| 6,044,228 | * | 3/2000 | Hara et al. | 396/55 |
| 6,078,436 | * | 6/2000 | Hirunuma et al. | 359/694 |
| 6,108,134 | * | 8/2000 | Hirunuma et al. | 359/557 |

FOREIGN PATENT DOCUMENTS

| 6-43365 | 2/1994 | (JP) . |
|---|---|---|
| 6308431 | 11/1994 | (JP) . |
| 10-20213 | 1/1998 | (JP) . |
| 10186228 | 7/1998 | (JP) . |

\* cited by examiner

*Primary Examiner*—Thong Nguyen
(74) *Attorney, Agent, or Firm*—Greenblum & Bernstein, P.L.C.

(57) ABSTRACT

Correction lenses are driven by a lengthwise-direction actuator in order to correct a tremble of a focused image in the lengthwise direction. A rotational motion of the lengthwise-direction actuator is transmitted to the correction lenses through a lengthwise-direction direct drive mechanism. A previous rotational direction of a motor of the lengthwise-direction actuator is memorized. It is judged that a rotational direction of the motor for correcting the tremble is the same as or the reverse of the previous rotational direction. If the rotational directions are the reverse, a driving pulse amount of the motor is adjusted such that a pulse count for canceling a play of engaging portions of the lengthwise-direction direct drive mechanism is included. With respect to correcting the tremble in the lateral direction, the same operation as described above is performed.

9 Claims, 13 Drawing Sheets

TREMBLE PREVENTING DEVICE

BACKGROUND OF THE INVENTION

1. Field of the Invention

The present invention relates to a tremble preventing device mounted in an optical device, for example, binoculars.

2. Description of the Related Art

Conventionally, an optical device, for example, binoculars, is provided with a tremble preventing device which corrects a tremble of a focused image due to camera-shake and so on. In the tremble preventing device, correction optical systems are moved by a predetermined amount such that a movement of the optical device is canceled, enabling the tremble of the focused image to be corrected. Direct-drivetype actuators that include a stepping motor are utilized as a driving device of the correction optical systems. A rotational motion of the stepping motor is transmitted to the correction optical systems, after being converted to a two-dimensional rectilinear motion of the correction optical systems by a transmitting mechanism, on a plane perpendicular to optical axes of the correction optical systems.

A driving amount of the correction optical systems corresponding to one rotation step of the stepping motor is determined due to an angular degree through which one rotation of the stepping motor moves and a construction of the transmitting mechanism. Accordingly, the driving amount of the correction optical systems can be controlled by a step amount of the stepping motor, so that a position of the correction optical systems can be easily determined.

For example, a gear mechanism or a screw mechanism is utilized as the transmitting mechanism. However, play exists in the engaging portion of such a gear mechanism and a screw mechanism. Thus, when a direction of drive of the engaging portion is reversed, an initial rotational motion of the stepping motor is spent in taking-up the backlash, and is not transmitted to the correction optical systems.

Namely, even if the stepping motor is driven by pulses calculated based on a trembling amount of the focused image, the correction optical systems are not accurately driven due to the aforementioned backlash. In order to prevent the inaccurate driving due to the backlash, a spring member may be mounted, urging the engaging portion in a predetermined direction such that a positional engagement remains unchanged at all times when the driving operation starts.

However, the mounting of the spring member causes an increase in a number of members in the optical device, a rise in a manufacturing cost, and an enlargement in an overall size and weight of the optical device.

SUMMARY OF THE INVENTION

Therefore, an object of the present invention is to provide a tremble preventing device that drives correction optical systems accurately without backlash.

In accordance with an aspect of the present invention, there is provided a tremble preventing device comprising: a detector that detects an amount of an optical device tremble; correcting optical systems that correct a tremble of a focused image due to the optical device tremble; driving systems that include an actuator and a transmitting mechanism that transmits a motion of the actuator to the correction optical systems, the driving systems driving the optical systems along a predetermined axis on a plane perpendicular to optical axes of the correction optical systems; and a controller that controls the driving systems such that a difference between the amount of the optical device tremble detected by the detector and positional data of the optical systems is canceled.

When the correction optical systems are moved in a moving direction opposite a previous moving direction in which the correction optical systems were previously moved, the controller controls the driving systems such that a backlash of the transmitting mechanism and the difference is canceled.

The controller comprises: an operator that operates a driving amount and a driving direction of the actuator whereby the correction optical Systems are moved such that the difference is canceled; and a driving direction checker that judges whether the driving direction of the actuator changes from a previous driving direction of the actuator.

When the driving direction checker judges that the driving direction changes, the operator calculates the driving amount of the actuator that includes a backlash driving amount component compensating the backlash.

The optical device further comprises a memory that stores the backlash driving amount component. When the driving direction checker determines that the driving direction changes, the operator reads the backlash driving amount component from the memory, and adjusts the driving amount of the actuator by the backlash driving amount component to cancel.

When the previous moving direction is a first direction along the predetermined axis and the moving direction is a second direction that is prolonged at an angle of 180 degrees against the first direction, being along the predetermined axis, the operator adds the backlash driving amount component to the driving amount that cancels the difference, and when the previous direction is the second direction and the opposite direction is the first direction, the operator subtracts the backlash driving amount component from the driving amount that cancels the difference.

The memory comprises a nonvolatile memory that is erasable and programable, and the actuator comprises a stepping motor. A rotational motion of the stepping motor is converted to a rectilinear motion by the transmitting mechanism.

For example, the transmitting mechanism comprises: a gear that is fixedly mounted on a free end of a rotational shaft of the stepping motor, opposite a journal of the rotational shaft; and a rack that is fixed on a supporting member of the correction optical systems, engaging the gear.

Further, for example, the transmitting mechanism comprises: a screw portion that is fixedly mounted on a tip of a rotational shaft of the stepping motor; and a nut portion that is fixed on a supporting member of the optical systems, engaging the screw portion.

DESCRIPTION OF THE PREFERRED EMBODIMENTS

Figure 1:
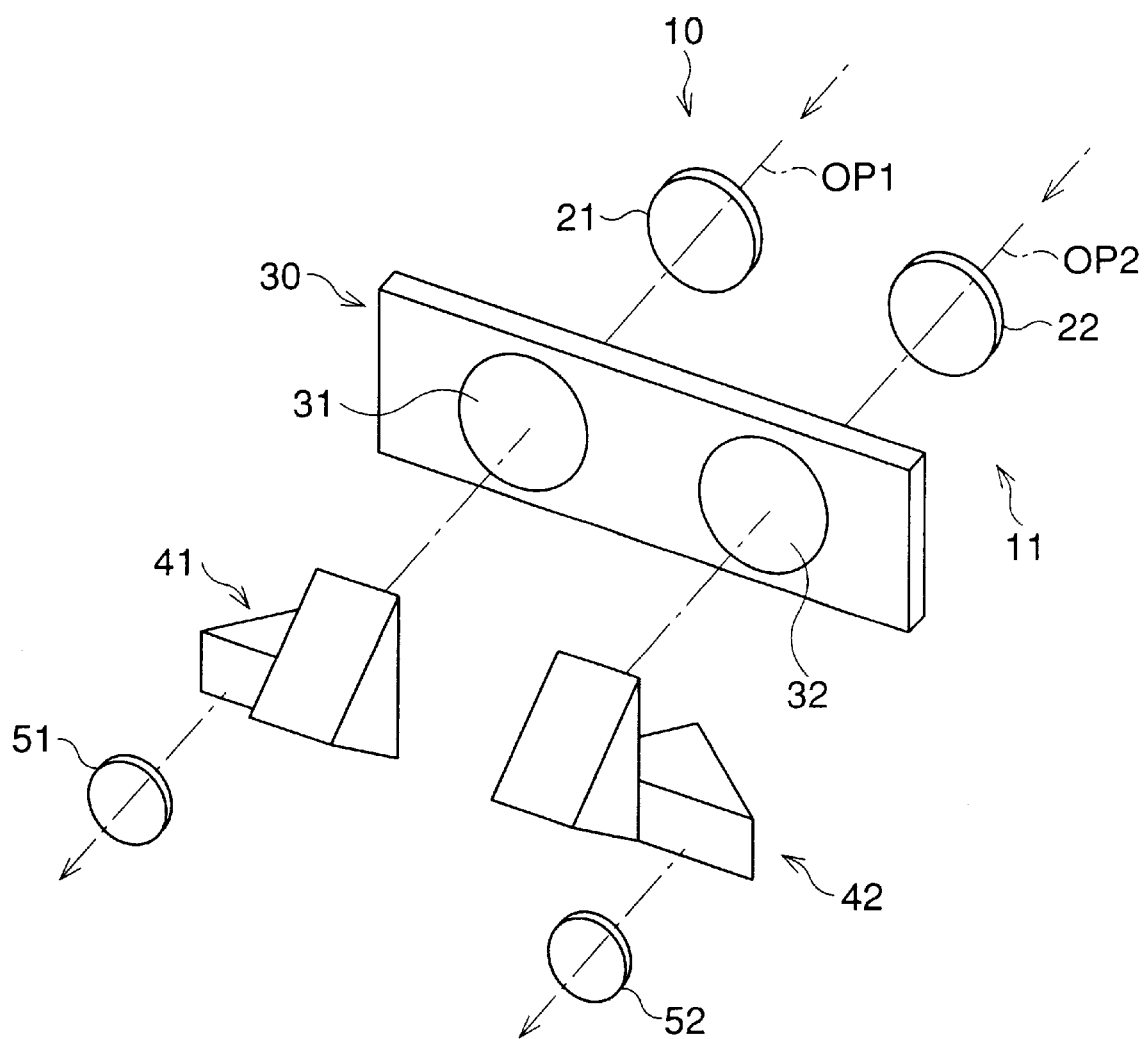
FIG. 1 is a conceptional view showing relational positions of optical systems of binoculars to which a first embodiment according to the present invention is applied.

The present invention will now be described with reference to embodiments shown in the drawings.

FIG. 1 is a typical view showing relational positions of optical systems of binoculars to which a first embodiment according to the present invention is applied. In a first optical system 10, after passing through a first objective lens 21 and a first correction lense 31, reflected light from an object is directed to a first eyepiece 51 through a first erecting prism 41. In a second optical system 11, after passing through a second objective lens 22 and a second correction lense 32, the reflected light is directed to a second eyepiece 52 through a second erecting prism 42.

The first and second correction lenses 31 and 32 are unitarily supported by a lens supporting frame 30. The relational position between each element of the first and second optical systems 31 and 32 is adjusted such that an optical axis OP1 of the first optical system 10 and an optical axis OP2 of the second optical system 11 are aligned in parallel.

Note that, in this specification, a "lateral direction" means a direction parallel to a standard plane on which the optical axes OP1 and OP2 lie, being perpendicular to the optical axes OP1 and OP2, and a "lengthwise direction" means a direction perpendicular to the standard plane. Namely, while the binoculars are held in a standard position, the lateral direction corresponds to a horizontal direction and the lengthwise-direction corresponds to a vertical direction.

Further, a "lengthwise-direction moving center position" means a position of the lens supporting frame 30 when optical axes of the correction lenses 31 and 32 lie on the standard plane. Furthermore, a "lateral-direction moving center position" means a position of the lens supporting frame 30 when the optical axis of the correction lens 31 lies on a plane, which is perpendicular to the standard plane and on which the optical axis OP1 lies, and the optical axis of the correction lens 32 lies on a plane which is perpendicular to the standard plane and on which the optical axis OP2 lies.

Namely, when the lens supporting frame 30 is disposed at the lengthwise-direction moving center position and also at the lateral-direction moving center position, the optical axes of the correction lenses 31 and 32 are respectively coaxial with the optical axes OP1 and OP2.

Figure 2:
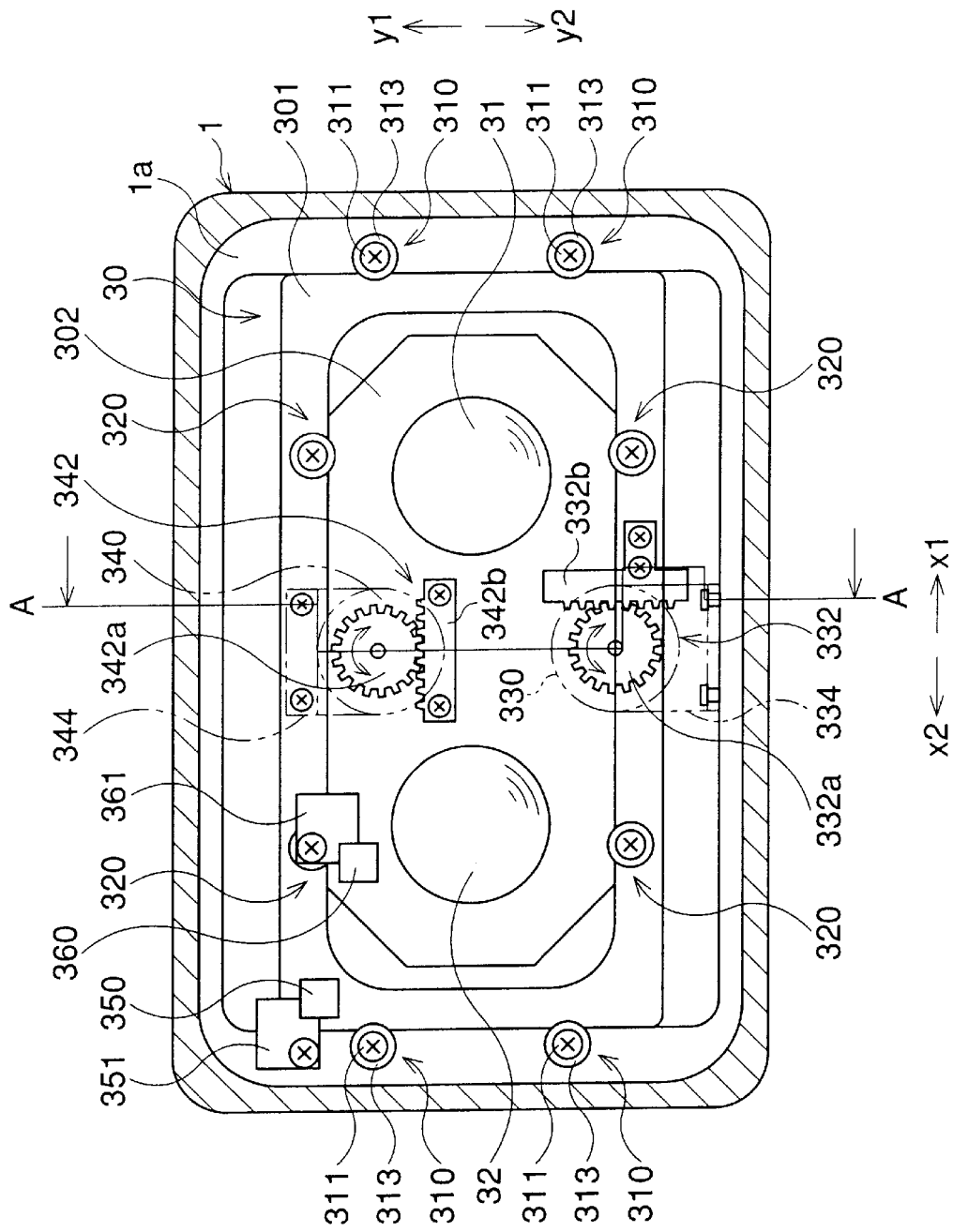
FIG. 2 is a front view of a lens supporting frame of the first embodiment.

FIG. 2 is a front view of the lens supporting frame 30, viewed on the side of the first and second objective lenses 21 and 22. The lens supporting frame 30 includes a lengthwise-direction driving frame 301 and a lateral-direction driving frame 302.

The lengthwise-direction driving frame 301 is a flat board. An opening portion is formed in a center of the driving frame 301. Namely, the driving frame 301 is a doughnut-shaped board. The driving frame 301 is supported by holding members 310 mounted in a flange 1a, which is unitarily formed on an inner wall 1 of the binoculars, to be slidable in the lengthwise direction so that the driving frame 301 when driven is led in the lengthwise direction.

The driving frame 302 is a flat board which unitarily holds the correction lenses 31 and 32, and is disposed in the opening of the driving frame 301. The driving frame 302 is supported by holding members 320 mounted in the driving frame 301, and is slidable in the lateral direction so that the driving frame 302 when driven is led in the lateral direction.

Figure 3:
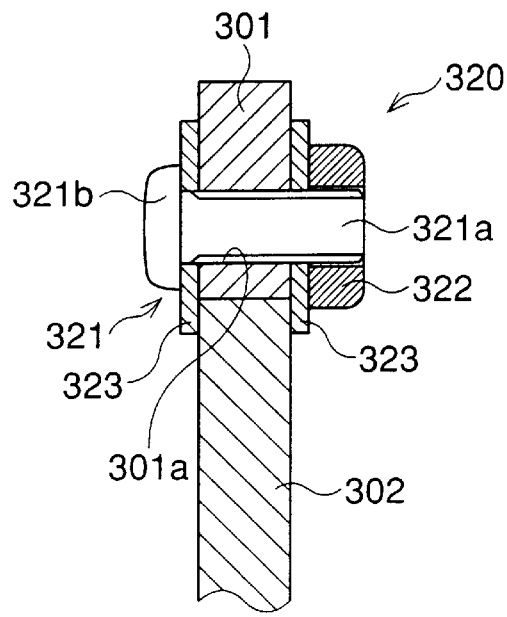
FIG. 3 is an enlarged sectional view of a holding member.

FIG. 3 is a sectional side view of the holding member 320. The holding member 320 comprises a screw 321, a nut 322 and a pair of washers 323. A shaft 321a of the screw 321 is received in a hole 301a formed in the lengthwise-direction driving frame 301. A thread is formed on the shaft 321a. The nut 322 is threadingly engaged on a free end of the shaft 321a, opposite a head 321b of the screw 321. One washer 323 is mounted between the head 321b and the driving frame 301, and another washer 323 is mounted between the nut 322 and the driving frame 301.

The radii of the washers 323 are greater than the length between a side surface of the driving frame 301, which is in contact with the side surface of the lateral-direction driving frame 302 and a longitudinal central axis of the shaft 321a. Namely, a perimeter portion of the driving frame 302 is lightly clamped by the pair of the washers 323, so that the driving frame 302 is partially interposed between the pair of washers 323. Accordingly, movement of the driving frame 302 parallel to the optical axes OP1 and OP2 is restrained, being led in the lateral direction when driven.

The holding member 310 (see FIG. 2) has a similar construction to that of the holding member 320. A shaft of a screw 311 is received in a hole formed in the flange 1a, and a nut (omitted in FIG. 2) is screwed on a free end of the shaft, opposite a head of the screw 311. One washer 313 (see FIG. 2) is mounted between the head of the screw 311 and the flange 1a, and another washer (not shown) is mounted between the nut and the flange 1a. A perimeter of the lengthwise-direction driving frame 301 is lightly clamped by the washers 313. Namely, similarly to the lateral-direction driving frame 302, the lengthwise-direction driving frame 301 is held by the washers 313 so as not to move in a direction parallel to the optical axes OP1 and OP2.

The perimeter of the lengthwise-direction driving frame 301, mounted in the flange 1a, is lightly clamped by the pair of washers 313 of the holding member 310, with the perimeter portion of the driving frame 302, mounted in the opening of the frame 301, being lightly clamped by the pair of the washers 323 of the holding member 320. Namely, the flange 1a and the frames 301, 302 are formed so that the thickness of the flange 1a, along the optical axes OP1 and OP2, is larger than the thickness of the frame 301, along the optical axes OP1, OP2, and the thickness of the frame 301 is larger than the thickness of the frame 302, along the optical axes OP1 and OP2.

Further, a difference between the thickness of the flange 1a and the thickness of the driving frame 301 is small, such that the movement of the driving frame 301 in the lengthwise direction is unaffected by friction between the pair of washers 313 and the driving frame 301, and the movement of the driving frame 301 parallel to the optical axes OP1 and OP2 is negligible.

Furthermore, a difference between the thickness of the driving frame 301 and the thickness of the driving frame 302 is small, such that the movement of the driving frame 302 in the lateral direction is unaffected by friction between the pair of washers 323 and the driving frame 302, and the movement of the driving frame 302 parallel to the optical axes OP1, OP2 is negligible.

Figure 4:
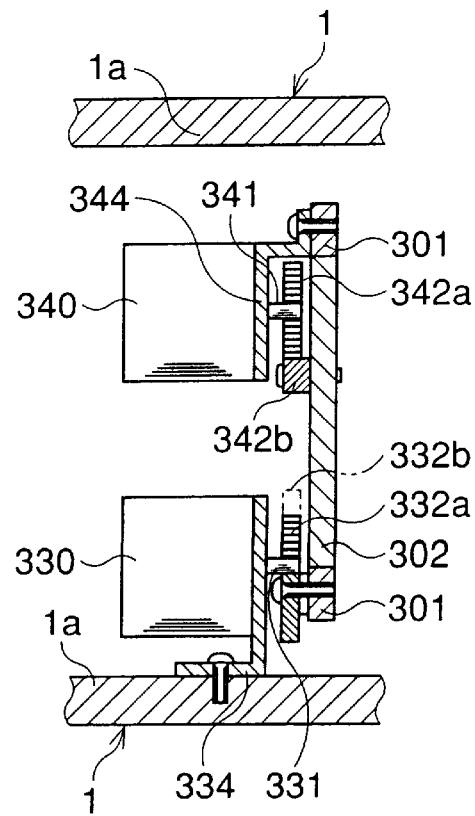
FIG. 4 is a sectional side view of the lens supporting frame of the first embodiment.

FIG. 4 is a sectional side view taken in the direction of the arrows substantially along the line A—A of FIG. 2. Actuators of the first embodiment will be explained, with reference to FIGS. 2 and 4.

A lengthwise-direction actuator 330 is placed at a lower end portion of the driving frame 301, on a side of the first and second objective lenses 21 and 22. The lengthwise-direction actuator 330 is a stepping motor, being fixed on the flange 1a by a first fixing member 334. A lengthwise-direction direct-drive mechanism 332 is connected to the lengthwise-direction actuator 330. The direct drive mechanism 332 comprises a lengthwise-direction pinion gear 332a and a lengthwise-direction rack 332b. The pinion gear 332a is fixedly mounted on a free end of a rotating shaft 331 of the lengthwise-direction actuator 330, opposite the journal. The rack 332b is fixed on the lower end of the driving frame 301, and engages the pinion gear 332a.

A lateral-direction actuator 340 is placed at an upper end portion of the driving frame 301, on the side of the first and second objective lenses 21 and 22. The lateral-direction actuator 340 is a stepping motor, being fixedly on the driving frame 301 by a second fixing member 344. A lateral-direction direct-drive mechanism 342 is connected to the lateral-direction actuator 340. The direct drive mechanism 342 comprises a lateral-direction pinion gear 342a and a lateral-direction rack 342b. The pinion gear 342a is fixed mounted on a free end of a rotating shaft 341 of the lateral-direction actuator 340, opposite the journal. The rack 342b, which engages the pinion gear 342a, is fixed on the upper end of the driving frame 302, and is disposed between the first and second correction lenses 31 and 32.

Namely, the lengthwise-direction direct-drive mechanism 332 transmits a rotational motion of the actuator 330 to the driving frame 301, converting the rotational motion to rectilinear motion in the lengthwise direction, and the lateral-direction direct-drive mechanism 342 transmits a rotational motion of the actuator 340 to the driving frame 302, converting the rotational motion to rectilinear motion along in the lateral direction. Accordingly, the driving frame 301 is driven in accordance with the rotation of the actuator 330 in the lengthwise direction, and the driving frame 302 is driven in accordance with the rotation of the actuator 340 in the lateral direction. Further, note that, in FIG. 2, the lengthwise-direction actuator 330, the lateral-direction actuator 340, the first fixing member 334 and the second fixing member 344 are indicated with broken lines in order to explicitly show the engagement of the pinion gears (332a, 342a) and the racks (332b, 342b).

In FIG. 2, viewing from the side of the objective lenses 21 and 22, when the lengthwise-direction actuator 330 rotates clockwise, the pinion gear 332a also rotates clockwise. The clockwise rotation of the pinion gear 332a is transmitted to the driving frame 301 via the rack 332b. As described above, the driving frame 301 is slidably supported by the flange 1a.

Therefore, the driving frame 301 is driven downwardly in a direction y2. Similarly, when the actuator 330 rotates counterclockwise, the pinion gear 332a also rotates counterclockwise. The counterclockwise rotation of the pinion gear 332a is transmitted to the driving frame 301 via the rack 332b, so that the driving frame 301 is driven upwardly in a direction y1.

In FIG. 2, when the lateral-direction actuator 340 rotates clockwise, the pinion gear 342a also rotates clockwise. The clockwise rotation of the pinion gear 342a is transmitted to the driving frame 302 via the rack 332b. As described above, the driving frame 302 is slidably supported in the opening portion of the driving frame 301. Therefore, the driving frame 302 is driven in a direction from the first correction lens 31 to the second correction lens 32, i.e. in a direction x2. Similarly, when the actuator 340 rotates counterclockwise, the pinion gear 342a also rotates counterclockwise. The counterclockwise rotation of the pinion gear 342a is transmitted to the driving frame 302 via the rack 342b, so that the driving frame 302 is driven in a direction from the second correction lens 32 to the first correction lens 31, i.e. in a direction x1.

As shown in FIG. 2, a lengthwise-direction reset position detecting sensor 350 is fixed close to an upper left portion of the lengthwise-direction driving frame 301. The reset position detecting sensor 350 is a transmission-type photo-interrupter including a light-emitting element and a photo-receptor element, facing each other with a predetermined interval therebetween.

A lengthwise-direction reset position detecting piece 351 is fixed an upper left portion of the flange 1a. The reset position detecting piece 351 passes between the light-emitting element and the photo-receptor element according to the movement of the driving frame 301. The reset position detecting piece 351 is disposed such that a signal outputted from the reset position detecting sensor 350 changes when optical axes of the correction lenses 31 and 32 lie on the standard plane. Namely, the signal outputted from the reset position detecting sensor 350 changes when the lens supporting frame 30 is place at the lengthwise-direction moving center position.

As shown in FIG. 2, a lateral-direction reset position detecting sensor 360 is fixed in close proximity to the second correction lens 32 at an upper left portion of the lateral-direction driving frame 302. The reset position detecting sensor 360, similar to the reset position detecting sensor 350, is a transmission-type photo-interrupter.

A lateral-direction reset position detecting piece 361 is fixed between the second fixing member 344 and the lengthwise-direction reset position detecting sensor 350, at the upper left portion of the driving frame 301. The reset position detecting piece 361 passes between the light-emitting element and the photo-receptor element of the reset position detecting sensor 360 according to the movement of the driving frame 302.

The reset position detecting piece 361 is disposed such that a signal, outputted from the reset position detecting sensor 360, changes when the optical axis of the correction lens 31 lies on the plane which is perpendicular to the standard plane and on which the optical axis OP1 lies, and the optical axis of the correction lens 32 lies on the plane which is perpendicular to the standard plane and on which the optical axis OP2 lies. Namely, the signal outputted from the reset position detecting sensor 360 changes when the lens supporting frame 30 is at the lateral-direction moving center position.

As described above, in the first embodiment, the lengthwise-direction driving frame 301 and the lateral-direction driving frame 302 are united in the lens holding frame 30. Further, a driving mechanism of the correction lenses 31, 32, including the direct-drive mechanisms 332, 342, the reset position detecting sensors 350, 360 and the reset position detecting pieces 351, 361, is formed as one unit. Accordingly, the driving mechanism is easily mountable in the binoculars In the reset position detecting mechanisms (350, 351, 360, 361) of the first embodiment: the reset position detecting piece 351 is fixed on the flange 1a which is unmovable in the lengthwise direction and the transmission-type photo-interrupter 350 is fixed on the driving frame 301 which is movable in the lengthwise direction; and the reset position detecting piece 361 is fixed on the driving frame 301 which is unmovable in the lateral direction and the transmission-type photo-interrupter 360 is fixed on the driving frame 302 which is movable in the lateral direction.

However, it is possible to reverse the positional relationships between the reset position detecting pieces and the transmission-type photo-interrupters. The transmission-type photo-interrupter 350 may be fixed on the flange 1a and the reset position detecting piece 351 may be fixed on the driving frame 301 such that the reset position detecting piece 351 moves with the driving frame 301. Also, the transmission-type photo-interrupter 360 may be fixed on the driving frame 301 and the reset position detecting piece 361 may be fixed on the driving frame 302 such that the reset position detecting piece 361 moves with the driving frame 302.

Namely, the reset position detecting mechanisms (350, 351, 360, 361) may have such a construction that the positional relationship between the reset position detecting pieces (351, 361) and the transmission-type photo-interrupters (350, 360) are changed with respect to the driving frame utilized (301, 302), whereby the output signal of the transmission-type photo-interrupters (350, 360) change.

Further, in the first embodiment, the transmission-type photo-interrupters (350, 360) are utilized as the reset position detecting sensors. However, reflection-type photo-interrupters (photo-reflectors), in which a photo-receptor element detects reflected light from an object, can be utilized. The photo-receptor elements and light-emitting elements are disposed such that a light emitting surface of the light-emitting elements and a light receiving surface of the photo-receptor elements face in a same direction, and reset position detecting pieces are respectively placed, facing the light emitting surfaces and the light receiving surfaces. The positional relationship between the reflection-type photo-interrupters and the reset position detecting pieces is confirmed based on whether light emitted from the light-emitting elements is incident on the photo-receptor elements. Accordingly, it is judged whether the driving frames (301, 302) are at the reset positions.

Furthermore, similar to the case in which the transmission-type photo-interrupters (350, 360) are utilized, the reflection-type photo-interrupters and the pieces may be disposed such that the positional relationships between the reflection-type photo-interrupters and the pieces change with respect to the driving frame utilized (301, 302).

Namely, with respect to the reset position detecting mechanism in the lengthwise direction, the piece may be fixed on the flange 1a and the reflection-type photo-interrupter may be fixed on the driving frame 301; or the piece may be fixed on the driving frame 301 and the reflection-type photo-interrupter may be fixed on the flange 1a. Also, with respect to the reset position detecting mechanism in the lateral direction, the piece may be fixed on the driving frame 301 and the reflection-type photo-interrupter may be fixed on the driving frames 302; or the piece may be fixed on the driving frame 302 and the reflection-type photo-interrupter may be fixed on the driving frame 301.

Note that, in the first embodiment, a "lengthwise-direction reset position" means a position of the lengthwise-direction driving frame 301 when the signal outputted from the lengthwise-direction reset position detecting sensor 350 changes, and a "lateral-direction reset position" means a position of the lateral-direction driving frame 302 when the signal outputted from the lateral-direction reset position detecting sensor 360 changes.

In other words, the driving frames (301, 302), the position detecting sensors (350, 360) and the position detecting pieces (351, 360) are inter-relatedly disposed such that the lengthwise-direction reset position is a position of the lengthwise-direction driving frame 301 which is placed at the lengthwise-direction moving center position, and the lateral-direction reset position is a position of the lateral-direction driving frame 302 which is placed at the lateral-direction moving center position.

Accordingly, the lengthwise-direction reset position coincides with the lengthwise-direction moving center position, and the lateral-direction reset position coincides with the lateral-direction moving center position.

Figure 5:
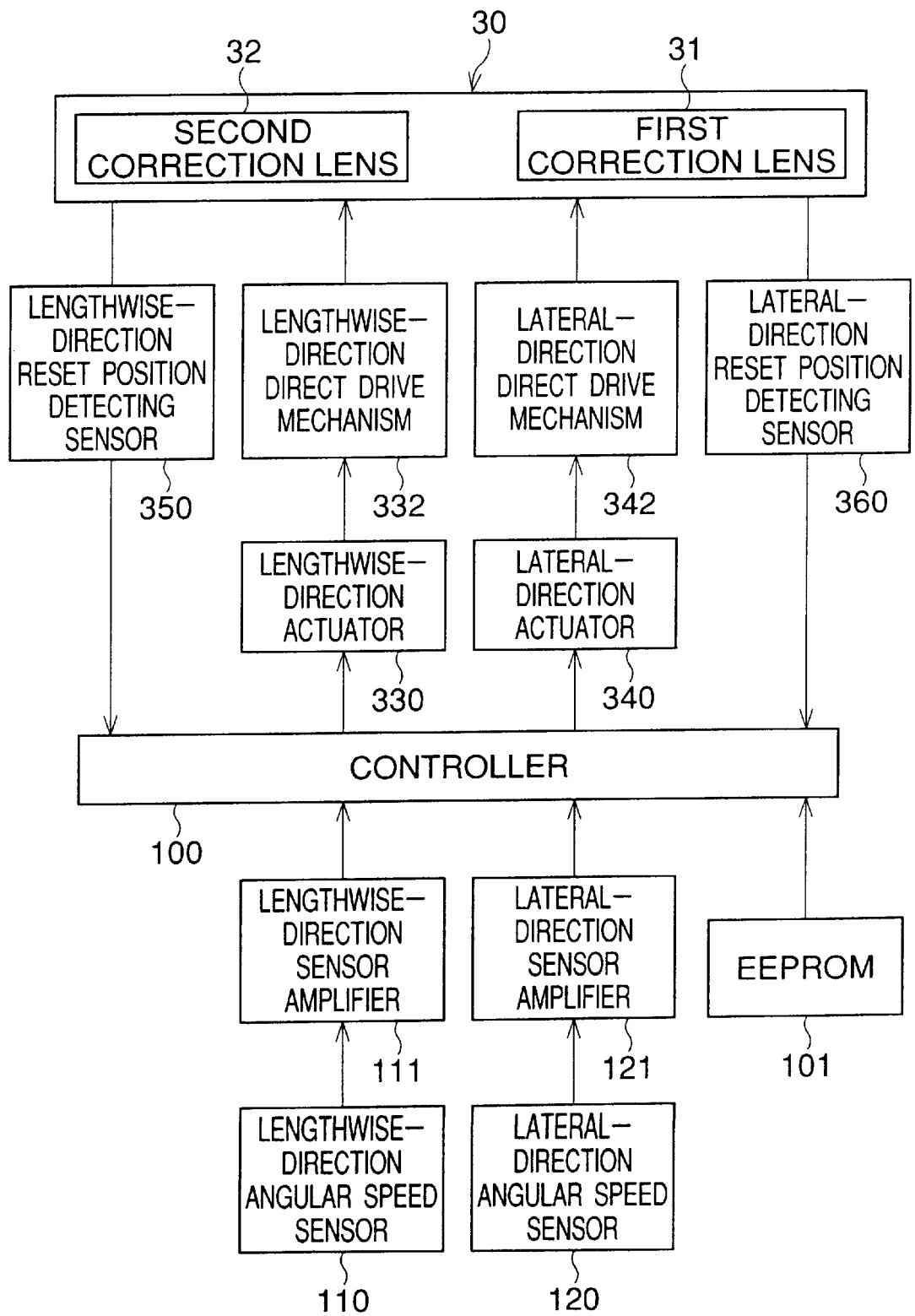
FIG. 5 is a block diagram of a tremble preventing device of the first embodiment.

FIG. 5 is a block diagram of the tremble preventing device of the first embodiment. A lengthwise-direction angular speed sensor 110 detects a vector and an angular speed of a trembling in the lengthwise direction, and a lateral-direction angular speed sensor 120 detects a vector and an angular speed of a trembling in the lateral direction, while the binoculars are being held by a user.

A lengthwise-direction sensor amplifier 111 is connected to the angular speed sensor 110, amplifying the lengthwise-direction angular speed outputted from the angular speed sensor 110. The amplified lengthwise-direction angular speed, outputted from the sensor amplifier 111, is inputted to a controller 100. The controller 100 is, for example, a micro computer. Similarly, a lateral-direction sensor amplifier 121 is connected to the angular speed sensor 120, amplifying the lateral-direction angular speed outputted from the angular speed sensor 120. The amplified lateral-direction angular speed outputted from the sensor amplifier 121 is inputted to the controller 100.

In the controller 100, the lengthwise-direction angular speed and the lateral-direction angular speed are respectively converted to digital values, based on a predetermined synchronous signal. Each digital value is subjected to integration, so that a lengthwise-direction angular displacement signal and a lateral-direction angular displacement signal, respectively corresponding to an amount of camera-shake in each of the directions, are calculated. Based on the lengthwise-direction angular displacement signal, a lengthwise-direction driving amount of the lens supporting frame 30 in a plane perpendicular to the optical axes OP1 and OP2, i.e. a driving step number of the motor of the lengthwise-direction actuator 330 (pulse number inputted to the motor), is calculated. Similarly, based on the lateral-direction angular displacement signal, a lateral-direction driving amount of the lens supporting frame 30 in a plane, i.e. a driving stop number of the motor of the lateral-direction actuator 340, is calculated.

The actuator 330 is rotated based on the pulse number outputted from the controller 100. The rotational motion of the actuator 330 is transmitted to the lens supporting frame 30 through the lengthwise-direction direct-drive mechanism 332, so that the lens supporting frame 30 is moved in the lengthwise-direction. Similarly, the actuator 340 is rotated based on the pulse number outputted from the controller 100. The rotational motion of the actuator 340 is transmitted to the lens supporting frame 30 through the lateral-direction direct-drive mechanism 342, so that the lens supporting frame 30 is moved in the lateral-direction.

The lengthwise-direction reset position detecting sensor 350 and the lateral-direction reset position detecting sensor 360 are connected to the controller 100. When the lens supporting frame 30 is placed at the lengthwise-direction reset position, the signal outputted from the reset position detecting sensor 350 changes. When the lens supporting frame 30 is placed at the lateral-direction reset position, the signal outputted from the reset position detecting sensor 360 changes. Both signals are inputted to the controller 100. The controller 100 judges whether the lens supporting frame 30 is placed at the lengthwise-direction and lateral-direction reset positions, by detecting the change of each signal.

Further, an EEPROM 101 is connected to the controller 100. The differences between the reset position and the moving center position, with respect to the lengthwise direction and the lateral direction, are stored in the EEPROM 101. As described above, from the viewpoint of design, the lengthwise-direction reset position coincides with the lengthwise-direction moving center position, and the lateral-direction reset position coincides with the lateral-direction moving center position. However, the differences are generated due to, for example, a tolerance in processing. Therefore, after reading out the differences, stored in the EEPROM 101, the controller 100 outputs predetermined pulse numbers to the lengthwise-direction and the lateral-direction actuators 330 and 340, based on the differences, such that the lens supporting frame 30 is moved from the reset position to the moving center position with respect to the lengthwise direction and the lateral direction.

Note that, the EEPROM 101 is a nonvolatile memory, which is erasable and programable. As the nonvolatile memory 101 is programable, unique values of the above-mentioned differences can be set in accordance with a characteristic of each pair of binoculars. Further, even if the above-mentioned differences change due to prolonged utilization of the binoculars over many years, the values can be updated, as the nonvolatile memory 101 is erasable and programable. Furthermore, as data, stored in the nonvolatile memory 101, is memorized after the supply of the power is stopped, it is unnecessary to provide a battery for back-up. Namely, the EEPROM 101 is most suitable for a memory of the tremble preventing apparatus, in which the above-mentioned differences are stored.

The procedure of the tremble prevention according to the first embodiment will be explained referring to FIGS. 6 through 10. Note that, in the first embodiment, the lens supporting frame 30 is moved by about 5 μm in accordance with one step rotation of the stepping motors; and the backlash of the direct-drive mechanism is about 10 μm. Accordingly, in the first embodiment, the backlash is canceled by two step rotations of the stepping motor. Further, in the first embodiment, the value of the step rotation for canceling the backlash is stored in the EEPROM 101. When the driving amount of the stepping motor is calculated, the value is read out from the EEPROM 101 by the controller 100, as described below.

Figure 6:
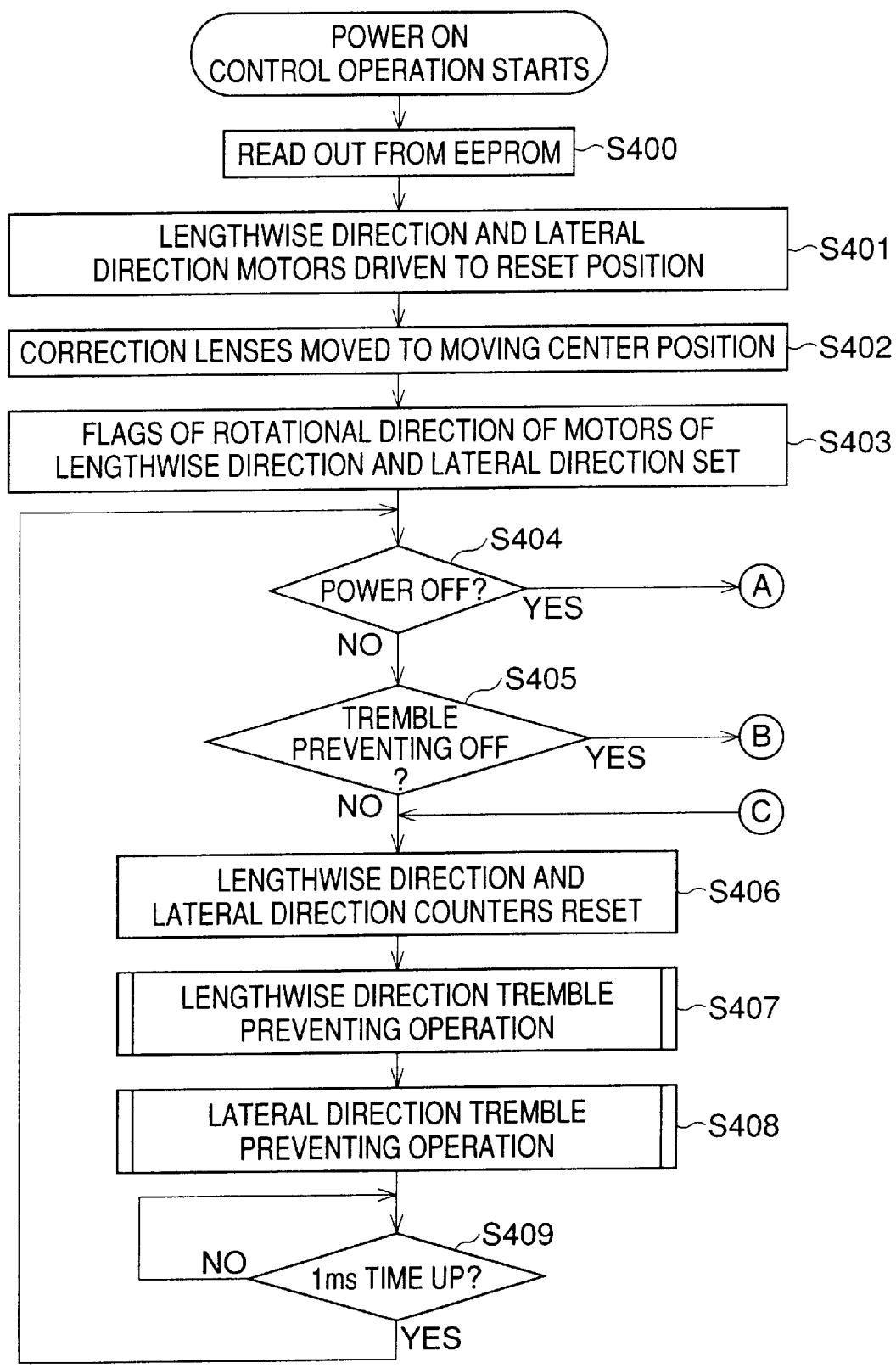
FIG. 6 is a flowchart a main routine of a tremble preventing operation performed in the first embodiment.
Figure 7:
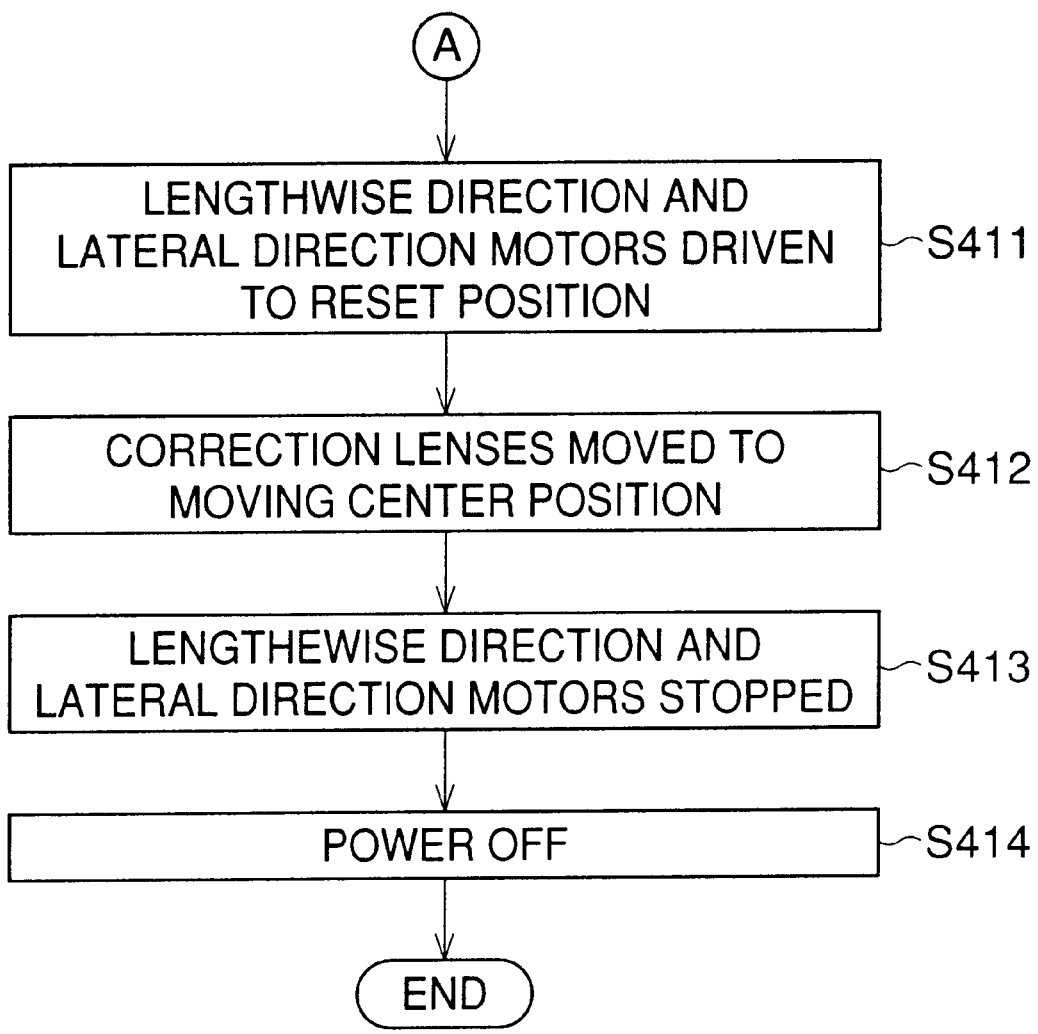
FIG. 7 is a flowchart indicating a power off procedure in the main routine.
Figure 8:
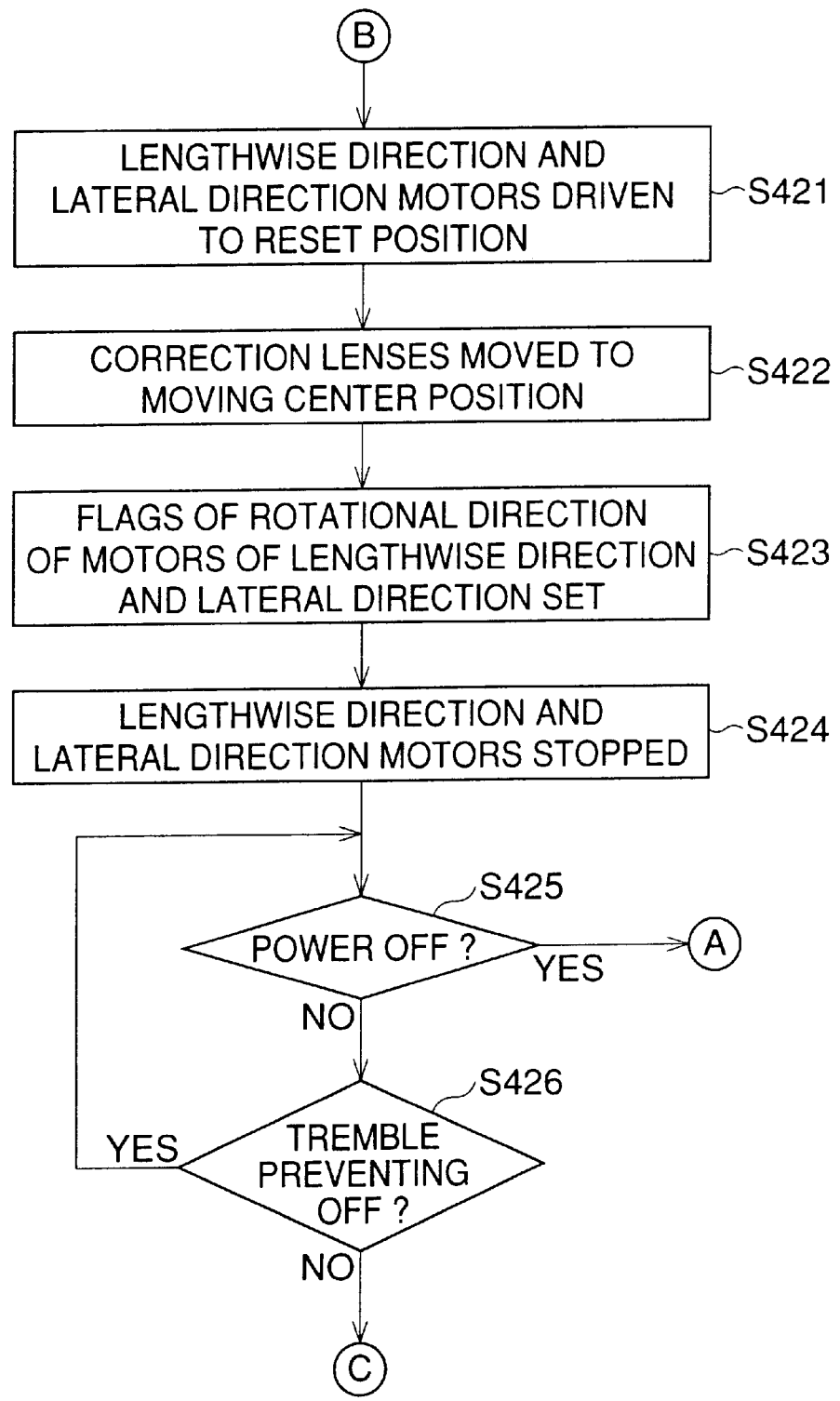
FIG. 8 is a flowchart indicating a tremble preventing switch off procedure in the main routine.

FIG. 6 is a flowchart of a main routine of the tremble preventing operation of the first embodiment, FIG. 7 is a flowchart indicating a procedure in the main routine for powering off the binoculars, and FIG. 8 is a flowchart indicating a procedure in the main routine for turning off a tremble-preventing-switch.

In FIG. 6, when a power switch of the binoculars is pressed and power is supplied to the controller 100, the main routine is started. In step S400, the difference between the reset position and the moving center position and the driving stop mount of the motor for canceling the play of the engaging portion, with respect to the lengthwise direction and the lateral direction, are respectively read out from the EEPROM 101.

In stop S401, the motor of the lengthwise-direction actuator 330 and the motor of the lateral-direction actuator 340 are driven such that the lengthwise-direction driving frame 301 and the lateral-direction driving frame 302 are respectively disposed at the reset positions. Then, in step S402, based on the difference between the reset positions and the moving center positions, the actuators 330 and 340 are driven, so that the lens supporting frame 30 is moved to be disposed at the lengthwise-direction moving center position and the lateral-direction moving center position.

In step S403, flags F1 and F2 are set to a predetermined value. The flag F1 indicates the rotational direction of the motor of the lengthwise-direction actuator 330, and the flag F2 indicates the rotational direction of the motor of the lengthwise-direction actuator 340. When the motor of the actuator 330 is rotated clockwise viewed in the direction of FIG. 2 in order to drive the lens supporting frame 30 to the lengthwise-direction moving center position, driving the lens supporting frame 30 in the direction y2 (the down direction, namely a negative direction), the flag F1 is set to "+1". Similarly, when the motor of the actuator 330 is rotated counterclockwise viewed in the direction of FIG. 2, driving the lens supporting frame 30 in the direction y1 (the up direction, namely a positive direction), the flag F1 is set to "−1".

Further, when the motor of the actuator 340 is rotated clockwise viewed in the direction of FIG. 2 in order to drive the lens supporting frame 30 to the lateral-direction moving center position, driving the lens supporting frame 30 in the direction x2 (the left direction, namely a negative direction), the flag F2 is set to "+1". Similarly, when the motor of the actuator 340 is rotated counterclockwise viewed in the direction of FIG. 2, driving the lens supporting frame 30 in the direction x1 (the right direction, namely a positive direction), the flag F2 is set to "−1".

Then, in step S404, the state of the power switch is detected. If the power switch is OFF, the process goes to the procedure of FIG. 7.

In FIG. 7, step S411, the motors of the lengthwise-direction actuator 330 and the lateral-direction actuator 340 are respectively driven such that the lengthwise-direction driving frame 301 and the lateral-direction driving frame 302 are respectively disposed at the reset positions. In step S412, the motors of the actuators 330 and 340 are respectively driven based on the differences between the reset positions and the moving center positions read out from the EEPROM 101, so that the lens driving frame 30 is driven to the lengthwise-direction moving center position and the lateral-direction moving center position.

Then, in step S413, the motors of the lengthwise-direction actuator 330 and the lateral-direction actuator are stopped. In step S414, the supply of the power is stopped and the process ends.

On the other hand, if the power switch is ON in step S404 of FIG. 6, the process goes to step S405. In step S405, the state of the tremble preventing switch is detected. If the tremble preventing switch is OFF, the process goes to the flowchart of FIG. 8. If the tremble preventing switch is ON, the process goes to step S406.

In step S421 of FIG. 8, the motors of the lengthwise-direction actuator 330 and the lateral-direction actuator 340 are respectively driven such that the lengthwise-direction driving frame 301 and the lateral-direction driving frame 302 are respectively disposed at the reset positions. In step S422, similarly to the operation of step S412, the motors of the actuators 330 and 340 are respectively driven, so that the lens driving frame 30 is driven to the lengthwise-direction moving center position and the lateral-direction moving center position.

In step S423, the flag F1 is set to a value corresponding to the rotational direction of the motor of the lengthwise-direction actuator 330, which has been driven in order to dispose the lens supporting frame 30 at the lengthwise-direction moving center position. Similarly, the flag F2 is set to a value corresponding to the rotational direction of the motor of the lateral-direction actuator 340, which has been driven in order to dispose the lens supporting frame 30 at the lateral-direction moving center position.

In step S424, the motors of the lengthwise-direction actuator 330 and the lateral-direction actuator 340 are stopped, then the process goes to the step S425. In step S425, the state of the power switch is detected. If the power switch is OFF, the process jumps to step S411 of FIG. 7 and the ending operation is performed as described above. If the power switch is ON, the process goes to step S426. In step S426, the state of the tremble preventing switch is detected. If the tremble preventing switch is OFF, the process returns to step S425, and if the tremble preventing switch is ON, the process goes to stop S406 of FIG. 6. Namely, the operations of steps S425 and S426 are repeatedly performed, until the power switch is OFF or the tremble preventing switch is ON.

As described above, when it is judged that the tremble preventing switch is ON in steps S405 of FIG. 6 or S426 of FIG. 8, the process goes to step S406 of FIG. 6. In step S406, a lengthwise-direction counter and a lateral-direction counter are set to "0".

When the motor of the lengthwise-direction actuators 330 is rotated clockwise to move the lens supporting frame 30 in the direction y2, the step amount of the motor is added to the value of the lengthwise-direction counter, and when the motor of the lengthwise-direction actuators 330 is rotated counterclockwise to move the lens supporting frame 30 in the direction y1, the step amount of the motor is subtracted from the value of the lengthwise-direction counter.

When the motor of the lateral-direction actuator 340 is rotated clockwise to move the lens supporting frame 30 in the direction x2, the step amount of the motor is added to the value of the lateral-direction counter, and when the motor of the lateral-direction actuators 340 is rotated counterclockwise to move the lens supporting frame 30 in the direction x1, the step amount of the motor is subtracted from the value of the lateral-direction counter.

Then, in step S407, a tremble preventing operation in the lengthwise direction is performed, and in step S408, a tremble preventing operation in the lateral direction is performed. In step S409, it is judged whether a predetermined time has passed. The operation of step S409 is repeatedly performed until the predetermined time passes. After the predetermined time passes, the operations from step S404 are performed. Accordingly, the tremble preventing operations of steps S407 and S408 are preformed once during the predetermined time. In the first embodiment, the predetermined time is pre-set to 1 ms.

Figure 9:
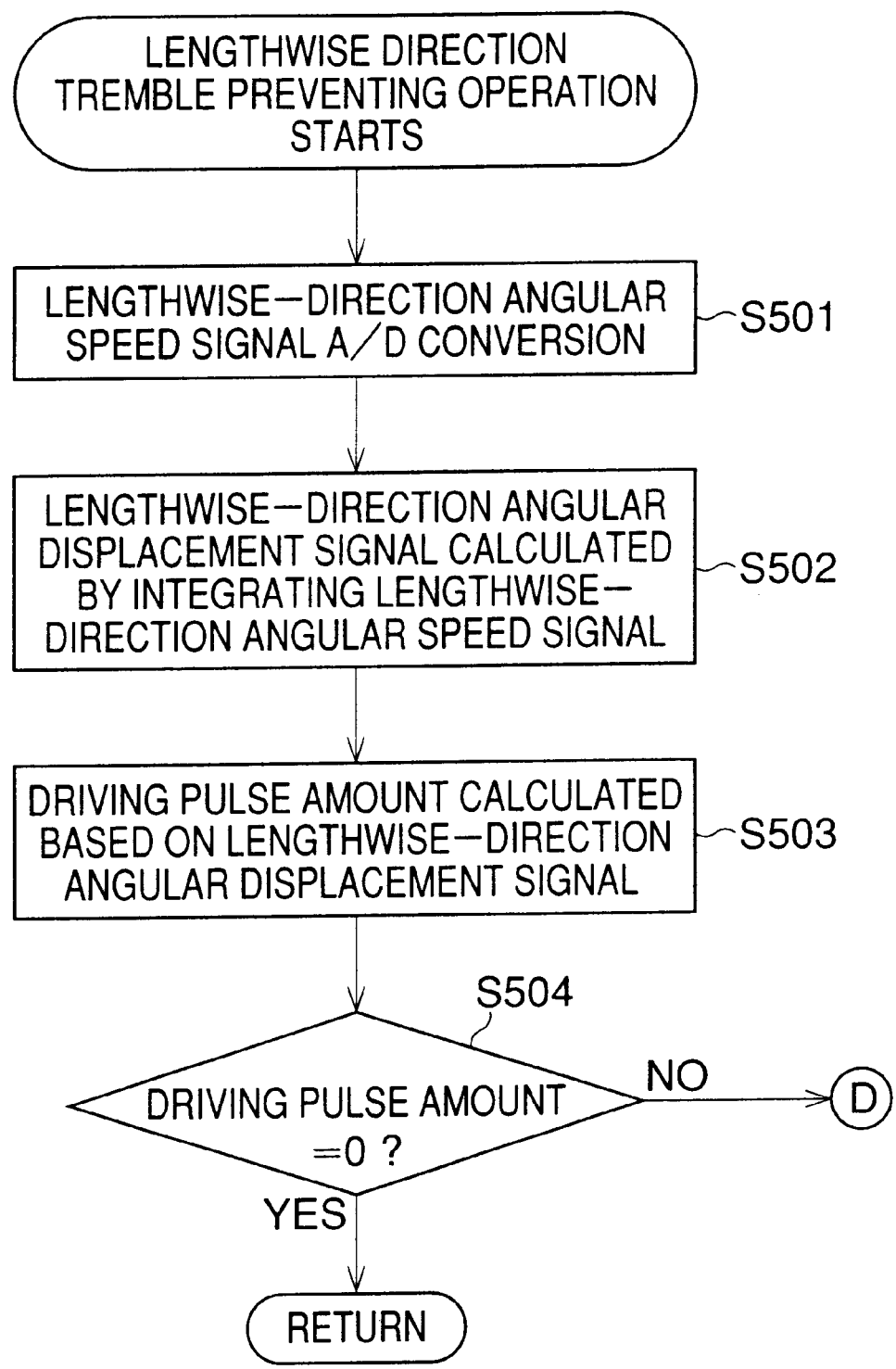
FIG. 9 is a flowchart indicating a beginning part of a procedure of a tremble preventing operation in a lengthwise direction.
Figure 10:
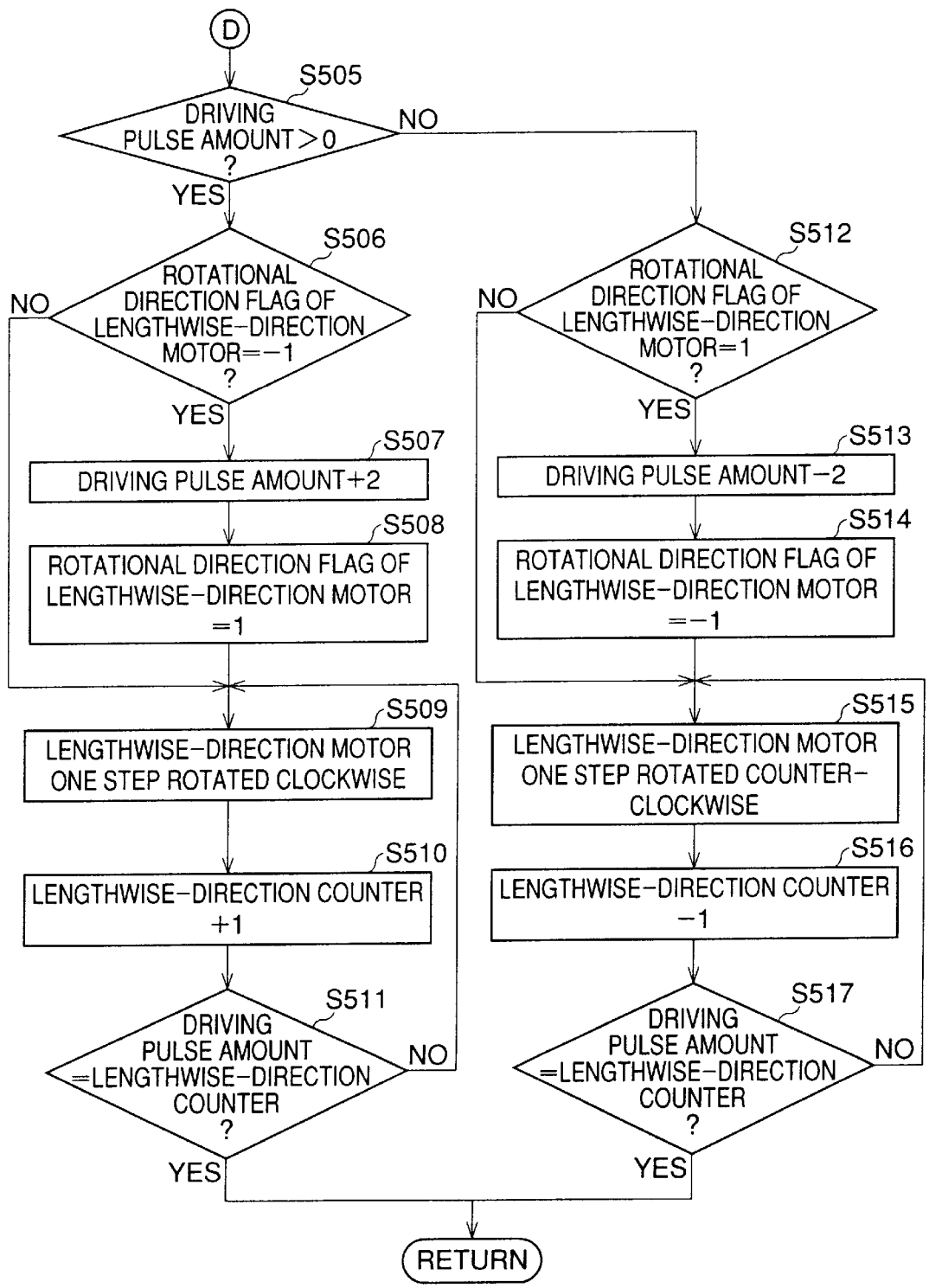
FIG. 10 is a flowchart indicating a main part of the procedure of the tremble preventing operation in the lengthwise direction.

FIGS. 9 and 10 indicate a process of the tremble preventing operation in the lengthwise-direction of step S407.

In step S501, the lengthwise-direction angular speed, inputted to the controller 100, is converted to a digital data. In step S502, the lengthwise-direction angular displacement is calculated by integrating the digital data. In step S503, a driving pulse amount of the motor of the lengthwise-direction actuator 330, namely the driving step amount of the actuator 330, is calculated based on the angular displacement. When the motor of the actuator 330 is rotated clockwise, the driving pulse amount is attached with a plus sign (+). When the motor of the actuator 330 is rotated counterclockwise, the driving pulse amount is attached with a minus sign (–).

In stop S504, it is judged whether the driving pulse amount equals "0". If the driving pulse amount equals "0", the tremble of the focused image viewed through the binoculars has not occurred. Accordingly, the tremble preventing operation ends, and the process goes to step S408 of FIG. 6. If the driving pulse amount does not equal "0", the process goes to steps S505 of FIG. 10.

In stop S505, it is judged whether the driving pulse amount is positive or negative. If the driving pulse amount is positive, namely if the motor of the lengthwise-direction actuator 330 is rotated clockwise, the process goes to step S506. If the driving pulse amount is negative, namely if the motor of the lengthwise-direction actuator 330 is rotated counterclockwise, the process goes to step S512.

In step S506, the value of the flag F1 is checked. If the value of the flag F1 is "–1", the process goes to step S507. As described above, the value "–1" of the flag F1 means that the motor of the lengthwise-direction actuator 330 had been rotated counterclockwise and the lens supporting frame 30 was driven in the direction y1 (the up direction). Further, as judged in step S505, the driving pulse amount is positive and the motor of the actuator 330 is going to be rotated clockwise. Namely, the rotational motion of the motor of the actuator 330 is reversed, and accordingly it is necessary to cancel the play of the engaging portions (backlash) of the lengthwise-direction direct drive mechanism 332. Thus, in step S507, "2" is added to the driving pulse amount based on the driving step amount of the motor for canceling the play of the engaging portions, read out from EEPROM 101 in step S400 (see FIG. 6).

Further, as the motor of the lengthwise-direction actuator 330 is rotated clockwise, the flag F1 is set to "+1" in step S508, and then the process goes to step S509.

In step S509, the motor of the actuator 330 is rotated clockwise by one step, and in step S510, the lengthwise-direction counter is incremented by one. Then, in step S511, it is checked whether the driving pulse amount coincides with the lengthwise-direction counter. If the driving pulse amount does not coincide with the lengthwise-direction counter, the process returns to step S509.

Namely, one clockwise step drive of the motor of the actuator 330 and the increment of the lengthwise-direction counter are repeatedly performed, until the driving pulse amount coincides with the lengthwise-direction counter. When the driving pulse amount coincides with the lengthwise-direction counter, the tremble preventing operation in the lengthwise-direction is completed by the driving of the motor of the actuator 330 by steps corresponding to the driving pulse amount and the movement of the lens supporting frame 30 in the direction y2. Thus, the process returns to step S408 of FIG. 6.

On the other hand, if the value of the flag F1 is "+1" in step S506, the motor of the lengthwise-direction actuator 330 had been rotated clockwise and the lens supporting frame 30 was driven in the direction y2 (the down direction). Further, as judged in stop S505, the motor of the actuator 330 is to be rotated clockwise. Namely, the motor of the actuator 330 is to be rotated in the same direction as the previous rotation. Accordingly it is unnecessary to cancel the play of the engaging portion (backlash) of the lengthwise-direction direct drive mechanism 332. Thus, the process jumps to step S509, without performing steps S507 and S508.

If the driving pulse amount is negative in step S505, namely if the motor of the lengthwise-direction actuator 330 is rotated counterclockwise, the process goes to step S512. In step S512, the value of the flag F1 is checked. If the value of the flag F1 is "+1", the process goes to step S513. As described above, the value "+1" of the flag F1 means that the motor of the lengthwise-direction actuator 330 had been rotated clockwise and the lens supporting frame 30 was driven in the direction y2 (the down direction) Further, as judged in step S505, the motor of the actuator 330 is to be rotated counterclockwise. Namely, the rotational motion of the motor of the actuator 330 is reversed, and accordingly it is necessary to cancel the play of the engaging portions (backlash) of the lengthwise-direction direct drive mechanism 332. Thus, in step S513, "2" is subtracted from the driving pulse amount based on the driving stop amount of the motor for canceling the play of the engaging portions, read out from the EEPROM 101 in step S400 (see FIG. 6).

Further, as the motor of the lengthwise-direction actuator 330 is rotated counterclockwise, the flag F1 is set to "−1" in step S514, and then the process goes to step S515.

In step S515, the motor of the actuator 330 is rotated counterclockwise by one step, and in step S516, the lengthwise-direction counter is decremented by one. Then, in step S517, it is checked whether the driving pulse amount coincides with the lengthwise-direction counter. If the driving pulse amount does not coincides with the lengthwise-direction counter, the process returns to step S515.

Namely, one counterclockwise step drive of the motor of the actuator 330 and the decrement of the lengthwise-direction counter are repeatedly performed, until the driving pulse amount coincides with the lengthwise-direction counter. When the driving pulse amount accords with the lengthwise-direction counter, the tremble preventing operation in the lengthwise-direction is completed by the driving of the motor of the actuator 330 by steps corresponding to the driving pulse amount and the movement of the lens supporting frame 30 in the direction y1. Thus, the process returns to step S408 of FIG. 6.

On the other hand, if the value of the flag F1 is "−1" in step S512, the motor of the lengthwise-direction actuator 330 had been rotated counterclockwise and the lens supporting frame 30 was driven in the direction y1 (the up direction). Further, as judged in step S505, the motor of the actuator 330 is to be rotated counterclockwise. Namely, the motor of the actuator 330 is to be rotated in the same direction as the previous rotation. Accordingly it is unnecessary to cancel the play of the engaging portions (backlash) of the lengthwise-direction direct drive mechanism 332. Thus, the process jumps to step S515, without performing steps S513 and S514.

As described above, the previous rotational direction of the motor of the lengthwise-direction actuator 330 is memorized, and it is checked that the rotational direction of the motor for performing the tremble preventing operation is the same as or the reverse of the previous rotational direction. When the rotational directions are the same, the motor of the lengthwise-direction actuator 330 is driven by the pulse count calculated by the controller 100. When the rotational directions are the reverse, the motor of the actuator 330 is driven, after the pulse count is adjusted such that a pulse count for canceling the play of the engaging portions of the lengthwise-direction direct drive mechanism 332 is included.

Further, as seen from FIG. 6 (steps S406 and S407), FIG. 9 (stop S504) and FIG. 10 (steps S511 and S517), in the tremble preventing operation of the first embodiment, the correction lenses are driven in real time by repeating a unit operation, in which the correction lenses 31, 32 are moved by a related driving amount from the position where the correction lenses were disposed by the previous driving operation, to the position where the correction lenses should be disposed by the current driving operation.

Figure 11:
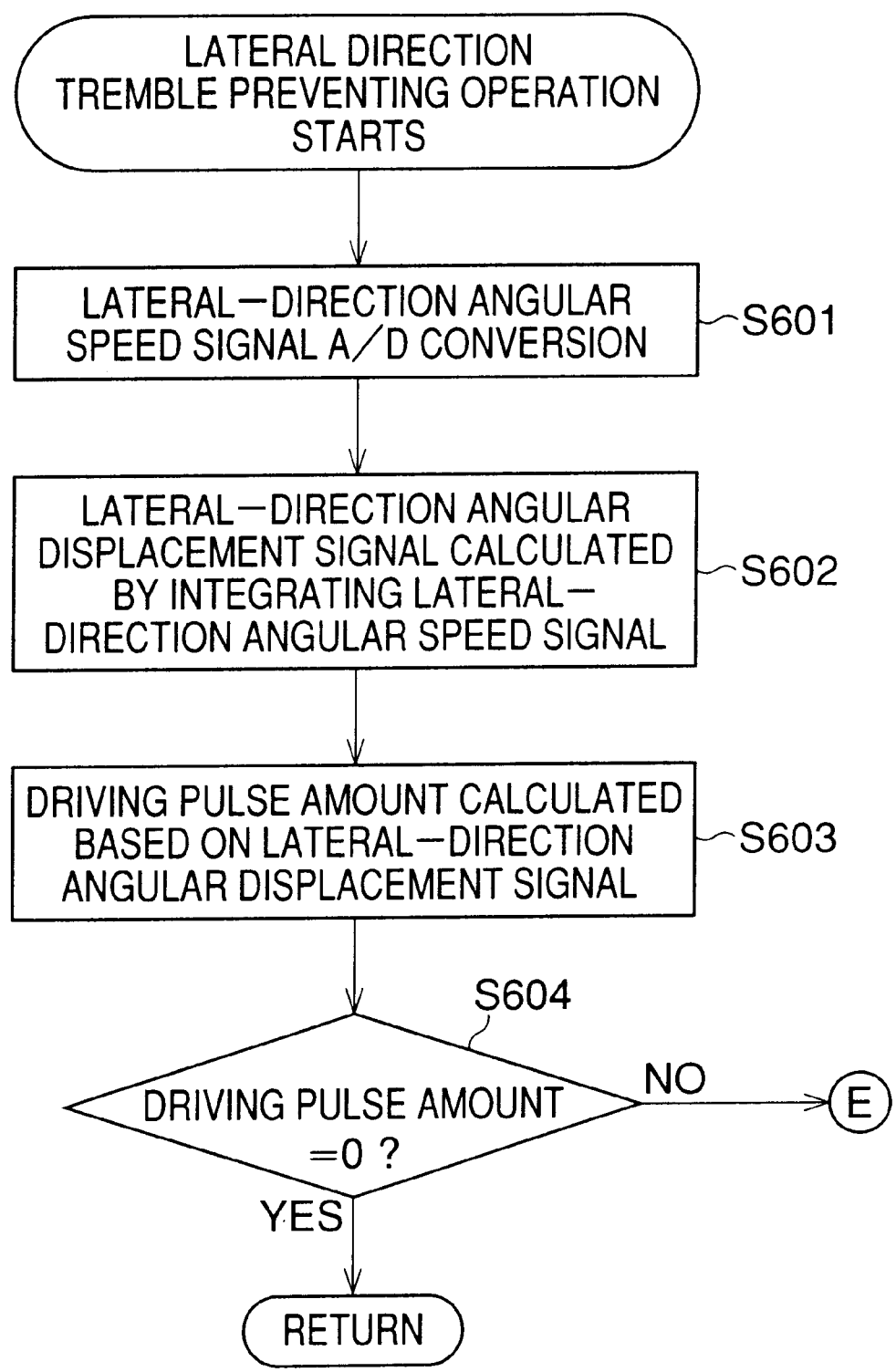
FIG. 11 is a flowchart indicating a beginning part of a procedure of a tremble preventing operation in a lateral direction.
Figure 12:
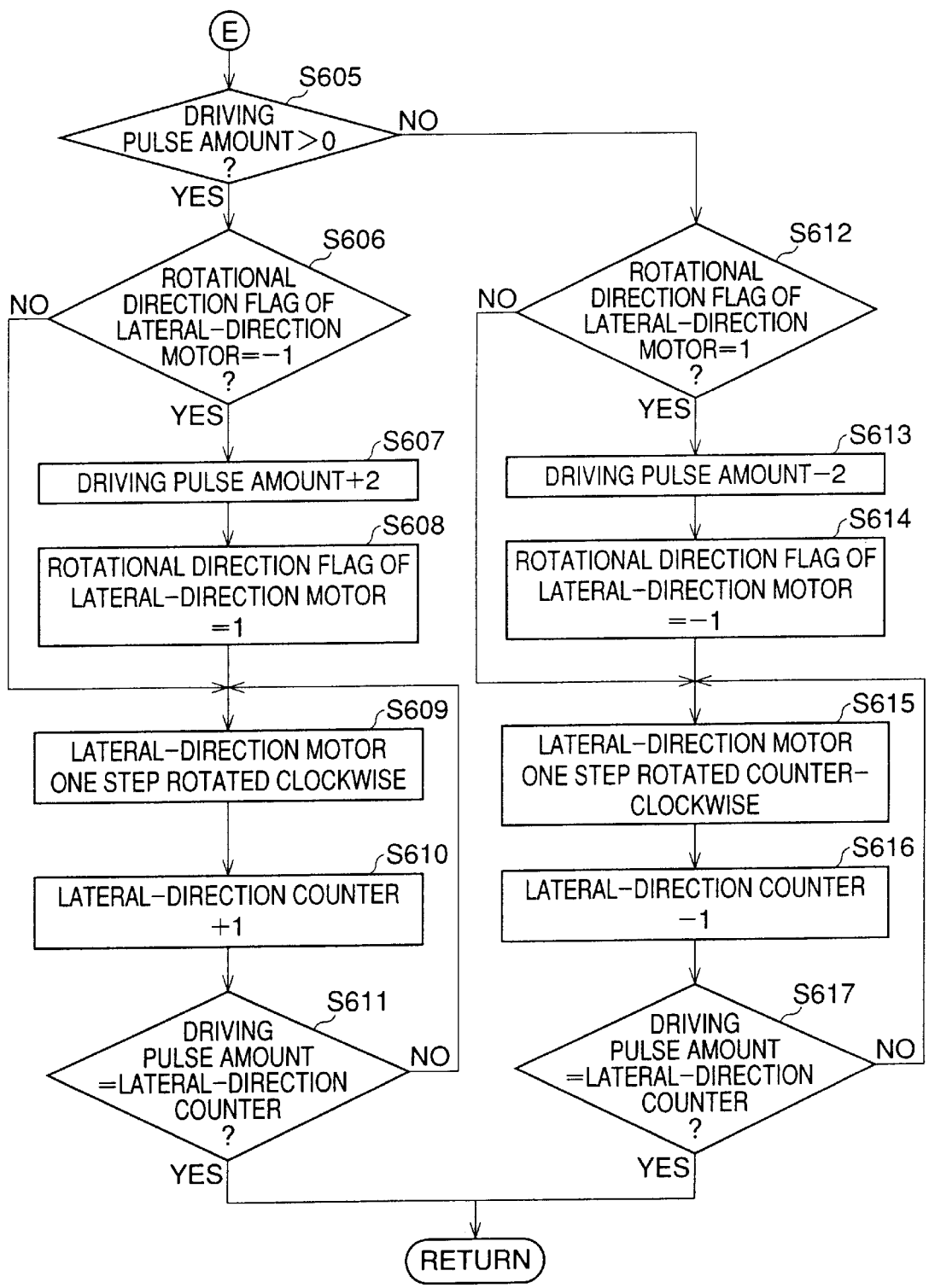
FIG. 12 is a flowchart indicating a main part of the procedure of the tremble preventing operation in the lateral direction.

In FIG. 6, after the tremble preventing operation in the lengthwise-direction of step S407 ends, the tremble preventing operation in the lateral-direction is performed in step S408. As indicated in FIGS. 11 and 12, the tremble preventing operation in the lateral-direction is performed similarly to the tremble preventing operation in the lengthwise-direction.

A lateral-direction angular speed signal, outputted from the lateral-direction angular speed sensor, is converted to a digital data (step S601), a lateral-direction angular displacement signal is calculated by integrating the digital data (step S602). A driving pulse amount is calculated based on the lateral-direction angular displacement signal (step S603). Note that, when the motor of the lateral-direction actuator 340 is rotated clockwise, the driving pulse amount is attached with a plus sign (+), and when the motor of the actuator 340 is rotated counterclockwise, the driving pulse amount is attached with a minus sign (−).

Further, the previous rotational direction of the motor of the lateral-direction actuator 340 is stored by the flag F2. When the value of the flag F2 is "+1", it means that the motor of the actuator 340 has been rotated clockwise, driving the lens supporting frame 30 in the direction x2 (the left direction, see FIG. 2). When the value of the flag F2 is "−1", it means that the motor of the actuator 340 is rotated counterclockwise, driving the lens supporting frame 30 in the direction x1 (the right direction, see FIG. 2).

By comparison of the value of the flag F2 and the sign of the driving pulse amount, it is judged whether the rotational direction of the motor of the lateral-direction actuator 340 for performing the lateral-direction tremble preventing operation is the same as or the reverse of the previous rotational direction of the motor (steps S605, S606 and S612).

If the rotational directions are the same, the motor of the actuator 340 is driven by the driving pulse amount calculated by the controller 100. If the rotational directions are reversed, the motor of the actuator 340 is driven after the driving pulse amount is adjusted such that a driving pulse amount for canceling the play of the engaging portions of the lateral-direction direct drive mechanism 342 is included (steps S607 and S613).

As described above, according to the first embodiment, if the rotational direction of the motors of the lengthwise-direction actuator 330 and the lateral-direction actuator 340 are the reverse of the previous rotational directions, the driving pulse amount, for performing the tremble preventing operation, is adjusted such that the driving pulse amount, for canceling the play of the engaging portions of the lengthwise-direction and the lateral-direction direct drive mechanisms 332 and 342, is included. Consequently, it is avoided that the actual moving amount of the lens supporting frame 30 is below a required moving amount of the frame 30 for preventing the tremble of the focused image, due to a rotational motion of the motors of the actuators 330 and 340 being spent canceling the play of the engaging portions (backlash). Accordingly, the tremble preventing operation is accurately performed.

Figure 13:
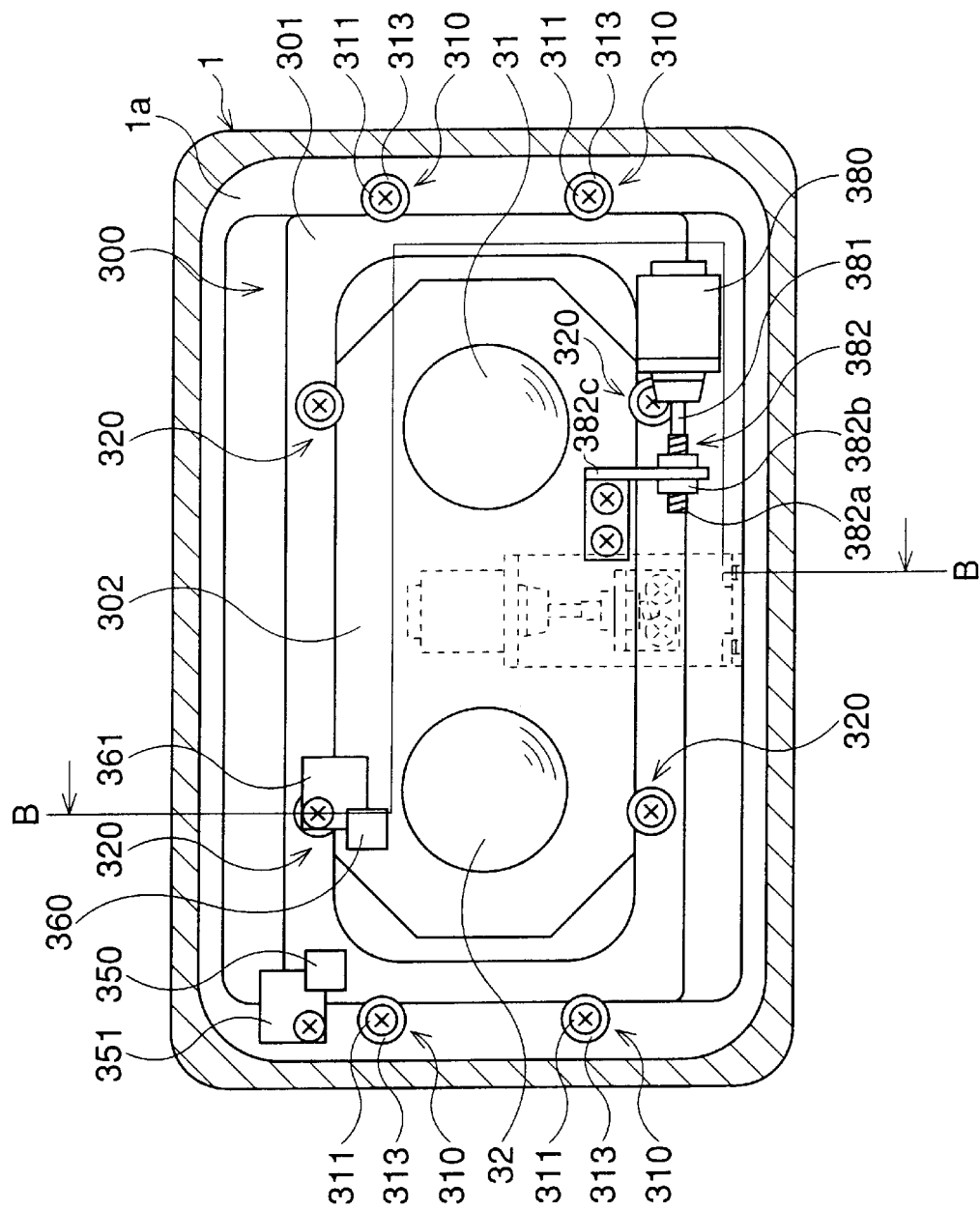
FIG. 13 is a front view of a lens supporting frame, to which a second embodiment according to the present invention is applied.
Figure 14:
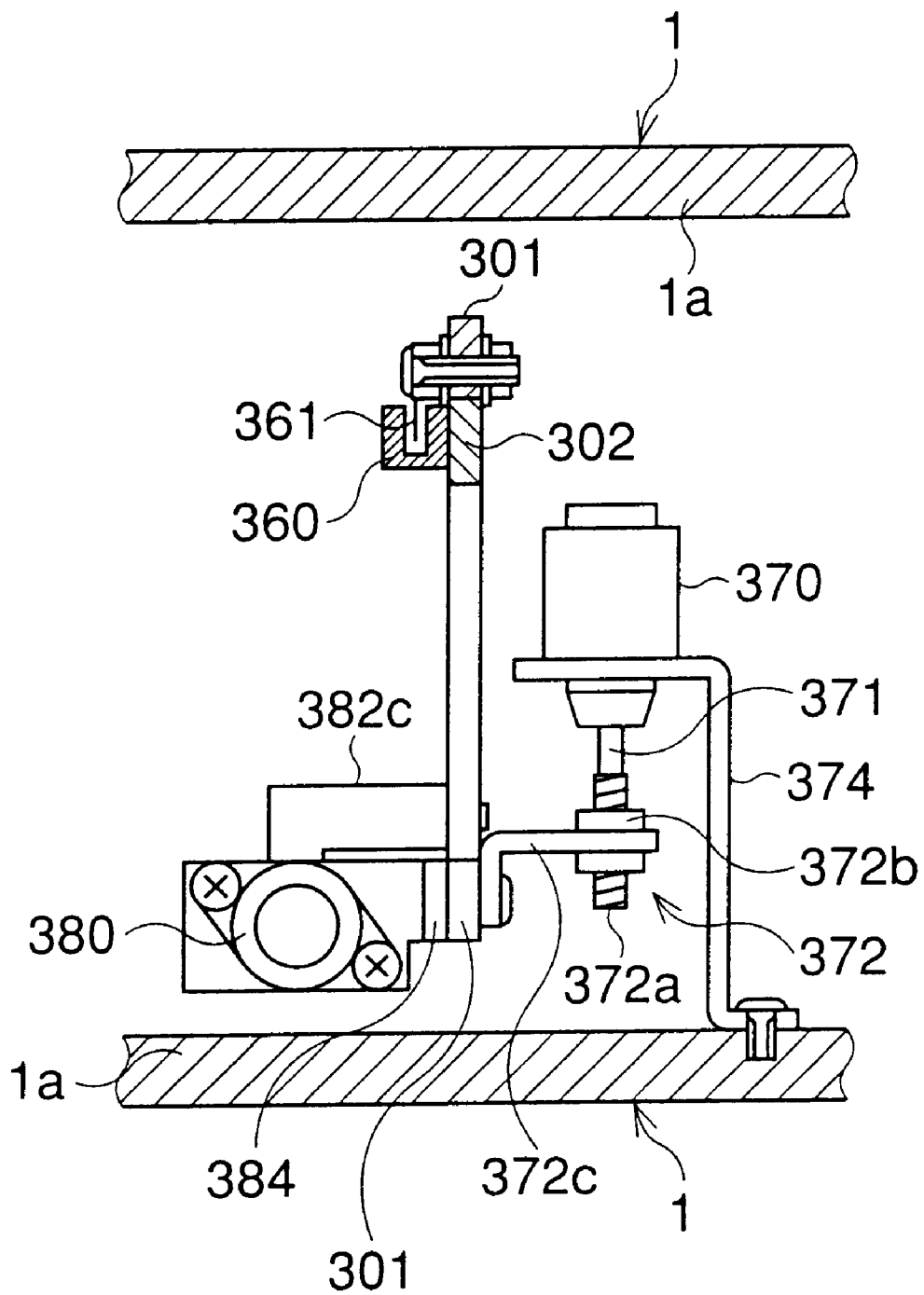
FIG. 14 is a sectional side view of the lens supporting frame of the second embodiment.

FIG. 13 is a front view of a lens supporting frame 300, to which a second embodiment according to the present invention is applied. In FIG. 13, components utilized in the first embodiment, which are identical in the second embodiment, share the same reference numerals. In the second embodiment, the positional relationship between the lens supporting frame 300 and other optical systems is similar to that of the first embodiment. FIG. 13 shows the lens supporting frame viewed from the side of the first and second objective lenses 21 and 22. Further, FIG. 14 is a sectional side view taken in the direction of the arrows substantially along a line B—B of FIG. 13.

A lengthwise-direction actuator 370 is disposed between the first and second correction lenses 31 and 32, on the side of the first and second erecting prisms 41 and 42. The lengthwise-direction actuator 370 is a stepping motor, being secured on the flange 1a by a first fixing member 374. A lengthwise-direction direct drive mechanism 372 comprises a male screw 372a, a nut 372b, and a metal support fixture 372c. The male screw 372a is fixedly mounted on a rotational shaft 371 of the actuator 370. The nut 372b engages the male screw 372a. The nut 372b is securely connected to the lengthwise-direction driving frame 301 by the the metal fixture 372c.

A lateral-direction actuator 380 is disposed close to the lower end of the lengthwise-direction driving frame 301, on the first and second objective lenses 21 and 22. The lateral-direction actuator 380 is a stepping motor, secured on the lengthwise-direction driving frame 301 by a second fixing member 384. A lateral-direction direct drive mechanism 382 comprises a male screw 382a, a nut 382b, a metal fixture 382c. The male screw 382a is fixedly mounted on a rotational shaft 381 of the actuator 380. The nut 382b engages with the male screw 382a. The nut 382b is securely connected to the lateral-direction driving frame 302 by the the metal support fixture 382c.

Similarly to the first embodiment, the rotational motion of the lengthwise-direction actuator 370 is changed to the rectilinear motion along the lengthwise direction by the lengthwise-direction direct drive mechanism 372, the rotational motion of the lateral-direction actuator 380 is changed to the rectilinear motion along the lateral direction by the lateral-direction direct drive mechanism 382. The other constructions of the lens supporting frame 300, except for the direct drive mechanisms, are similar to those of the lens supporting frame 30 of the first embodiment. Further, the procedure of the tremble preventing operation is similar to that of the first embodiment.

According to the first and second embodiments, the lengthwise-direction driving frame 301 is fixed on the flange 1a, which is unitarily formed on the body of the binoculars. Namely, the body has a function of holding the lengthwise-direction driving frame 301 itself. Accordingly, a number of the members mounted in the binoculars is lowered.

Further, according to the first and second embodiments, the difference between the reset position and the moving center position, with respect to the lengthwise direction and the lateral direction, and the driving step amount of the actuators for canceling the play of the engaging portions are stored in the EEPROM 101. Each pair of binoculars has a different value with respect to such data. However, according to the utilization of the EEPROM 101, individual values, which are calculated by examination in manufacturing, can be pre-set for each pair of binoculars. Further, if the values change due to long time of usage, the data stored in the EEPROM 101 may be updated by the manufacturer.

Note that, in the first and second embodiments, the flange 1a is unitarily formed on the inner wall 1 of the binoculars, however, an outer frame, being attachable to and removable from the body of the binoculars, can be mounted as a member which holds the lengthwise-direction driving frame 301.

According to the present invention, the tremble preventing device, which drives the correction optical systems accurately and is not influenced by backlash, can be provided for the binoculars.

The present disclosure relates to subject matter contained in the following Japanese Patent Application No.10-144371 (filed on May 26, 1998), which is expressly incorporated herein, by reference, in its entirety.

What is claimed is:

1. A tremble preventing device comprising:
   a detector that detects an amount of an optical device tremble;
   a correction optical system that corrects a tremble of a focused image due to said optical device tremble, said correction optical system including a lens supporting frame, said lens supporting frame comprising two supporting frames movable in directions orthogonal to each other, a first of said two supporting frames having an aperture in which a second of said two supporting frames is supported;
   a sensor that detects a position of said correction optical system and that outputs positional data associated with said position;
   a driving system that include an actuator and a transmitting mechanism that transmits a motion of said actuator to said correction optical system, said driving system driving said correction optical system along a predetermined axis on a plane perpendicular to an optical axis of said correction optical system; and
   a controller that controls said driving system such that a difference between said amount of said optical device tremble detected by said detector and said positional data of said correction optical system detected by said sensor is canceled;
   wherein, when said correction optical system is moved in a moving direction opposite a previous moving direction in which said correction optical system was previously moved, said controller controls said driving system such that a backlash of said transmitting mechanism and said difference is canceled.

2. The tremble preventing device of claim 1, wherein said controller comprises:
   an operator that operates a driving amount and a driving direction of said actuator whereby said correction optical system is moved such that said difference is canceled; and a driving direction checker that judges whether said driving direction of said actuator changes from a previous driving direction of said actuator;

wherein, when said driving direction checker judges that said driving direction changes, said operator calculates said driving amount of said actuator that includes a backlash driving amount component compensating said backlash.

3. The tremble preventing device of claim 2, further comprising a memory that stores said backlash driving amount component;

wherein, when said driving direction checker determines that said driving direction changes, said operator reads said backlash driving amount component from said memory, and adjusts said driving amount of said actuator by said backlash driving amount component to cancel said backlash.

4. The tremble preventing device of claim 3, wherein, when said previous moving direction is a first direction along said predetermined axis and said moving direction is a second direction that extends at an angle of 180 degrees with respect to said first direction along said predetermined axis, said operator adds said backlash driving amount component to said driving amount to cancel said difference, and when said previous moving direction is said second direction and said moving direction is said first direction, said operator subtracts said backlash driving amount component from said driving amount to cancel said difference.

5. The tremble preventing device of claim 3, wherein said memory comprises a nonvolatile memory that is erasable and programable.

6. The tremble preventing device of claim 1, wherein said actuator comprises a stepping motor.

7. The tremble preventing device of claim 6, wherein a rotational motion of said stepping motor is converted to a rectilinear motion by said transmitting mechanism.

8. The tremble preventing device of claim 7, wherein said transmitting mechanism comprises: a gear that is fixedly mounted on a free end of a rotational shaft of said stepping motor, opposite a journal of said rotational shaft; and a rack that is fixed on said lens supporting frame of said correction optical system, engaging said gear.

9. The tremble preventing device of claim 7, wherein said transmitting mechanism comprises: a screw portion that is fixedly mounted on a tip of a rotational shaft of said stepping motor; and a nut portion that is fixed on said lens supporting frame of said correction system, engaging said screw portion.

* * * * *